US012562594B1

(12) United States Patent
Ma et al.

(10) Patent No.: US 12,562,594 B1
(45) Date of Patent: Feb. 24, 2026

(54) MAGNETIC WIRELESS CHARGING QUICK-RELEASE MOUNT

(71) Applicant: Guangdong Shuowei Technology Co., Ltd, Dongguan (CN)

(72) Inventors: Wenhong Ma, Dongguan (CN); Lei Luo, Dongguan (CN); Hui Xia, Dongguan (CN); Lei Liu, Dongguan (CN)

( * ) Notice: Subject to any disclaimer, the term of this patent is extended or adjusted under 35 U.S.C. 154(b) by 0 days.

(21) Appl. No.: 19/284,296

(22) Filed: Jul. 29, 2025

(30) Foreign Application Priority Data

Jul. 14, 2025   (CN) .......................... 202521473976.0

(51) Int. Cl.
  H02J 50/00        (2016.01)
  H02J 50/10        (2016.01)
(52) U.S. Cl.
  CPC ............ H02J 50/005 (2020.01); H02J 50/10 (2016.02)
(58) Field of Classification Search
  CPC ................................ H02J 50/005; H02J 50/10
  USPC ......................................................... 320/108
  See application file for complete search history.

(56) References Cited

U.S. PATENT DOCUMENTS

| | | | | |
|---|---|---|---|---|
| 9,611,881 | B2 * | 4/2017 | Khodapanah | ........... F16B 21/06 |
| 2016/0259374 | A1 * | 9/2016 | Breiwa | ................. H01F 7/0247 |
| 2016/0365744 | A1 * | 12/2016 | Hyun | ........................ H04B 5/79 |
| 2024/0227585 | A1 * | 7/2024 | Na | .......................... H02J 50/10 |
| 2025/0167593 | A1 * | 5/2025 | Seth | ........................ H02J 50/90 |

* cited by examiner

*Primary Examiner* — Nathaniel R Pelton
(74) *Attorney, Agent, or Firm* — Daniel M. Cohn; Howard M. Cohn

(57) ABSTRACT

The present disclosure belongs to the technical field of electronic product accessories, in particular to a magnetic wireless charging quick-release mount, comprising a mount body which is integrally provided with: a lever-type quick-release mechanism configured to control mechanical locking and release of an electronic product; a magnetic quick-lock mechanism configured to provide rapid attachment of the electronic product and trigger mechanical locking of the lever-type quick-release mechanism. The present disclosure realizes multi-functional integration through five innovative mechanisms. The lever-type quick-release mechanism realizes quick unlocking with one hand, the magnetic quick-lock mechanism provides precise attachment and automatically triggers mechanical locking, the wireless charging module ensures stable power supply, the rotation positioning mechanism realizes 360° multi-angle adjustment and precise positioning, and the three-dimensional shock absorbing mechanism effectively absorbs vibration impact.

9 Claims, 12 Drawing Sheets

MAGNETIC WIRELESS CHARGING QUICK-RELEASE MOUNT

The present disclosure relates to the technical field of electronic product accessories, in particular to a magnetic wireless charging quick-release mount.

BACKGROUND

Quick-release device, also referred to as a quick-release mount, is primarily configured to secure electronic products and terminal devices such as smartphones and tablets onto cycling equipment via bicycle brackets, facilitating access to terminal devices during riding for users. However, existing quick-release devices still exhibit the following shortcomings in practical use.

Conventional magnetic wireless charging mounts rely solely on magnetic attraction, which proves inadequate to maintain connection strength on bumpy surfaces (e.g., unpaved roads), often resulting in device detachment during riding and potential damage. Conversely, clamp-type brackets fail to achieve rapid device engagement/disengagement, significantly compromising user convenience. Therefore, a magnetic wireless charging quick-release mount is provided to solve the above problems.

SUMMARY OF THE APPLICATION

I. Technical Problems Solved

In view of the shortcomings of the prior art, the present disclosure provides a magnetic wireless charging quick-release mount, which solves the problems mentioned in the above background technology that the conventional mounts have poor connection strength, often resulting in device detachment during riding and potential damage, and clamp-type brackets fail to achieve rapid device engagement/disengagement.

II. TECHNICAL SOLUTIONS

In order to achieve the above objective, the present disclosure specifically adopts the following technical solutions:

A magnetic wireless charging quick-release mount, comprising:

a mount body which is integrally provided with:

a lever-type quick-release mechanism configured to control mechanical locking and release of an electronic product;

a magnetic quick-lock mechanism configured to provide rapid attachment of the electronic product and trigger mechanical locking of the lever-type quick-release mechanism;

a wireless charging module configured to wirelessly power the electronic product;

a rotation positioning mechanism configured to adjust a circumferential angle of the rotation positioning mechanism relative to the mount body and achieve positioning;

a three-dimensional shock absorbing mechanism configured to buffer an impact force transmitted to the mount body; wherein the three-dimensional shock absorbing mechanism is rotatably connected to the mount body through the rotation positioning mechanism to form a dynamic shock absorbing connection system.

In some embodiments, the mount body is disc-shaped, the mount body includes a middle shell, an upper shell is clamped on a top of the middle shell, a lower shell is fixed on a bottom of the middle shell by a first locking screw, the magnetic quick-locking mechanism is integrated into an interior of the upper shell, the wireless charging module is integrated into the top of the middle shell, the lever-type quick-release mechanism is integrated into the bottom of the middle shell, the rotation positioning mechanism is integrated into an interior of the lower shell and separated from the lever-type quick-release mechanism by a pressure plate, the pressure plate is fixed to the bottom of the middle shell by a second locking screw, one side of the middle shell and one side of the lower shell are jointly provided with a through hole, a bottom of the lower shell is embedded with a damping sealing pad, the bottom of the lower shell is provided with an assembly hole, and a bottom of the pressure plate is provided with a central positioning shaft.

In some embodiments, the magnetic quick-lock mechanism includes a magnet group and a support ring, the support ring is disposed on a bottom of the magnet group, a magnet mounting groove is provided inside the upper shell, the magnet group includes a plurality of magnets disposed inside the magnet mounting groove in an annular array, and a wear-resistant silicone pad is embedded in a top of the upper shell.

In some embodiments, the wireless charging module includes a wireless charging PCBA, the wireless charging PCBA is fixed to the top of the middle shell by a third locking screw, a tray is provided on a top of the wireless charging PCBA, a wireless charging coil is provided inside the tray, a top of the wireless charging coil is closely attached to a top of an inner wall of the upper shell, a charging cable is integrated into a bottom of the wireless charging PCBA, and one end of the charging cable penetrates through the middle shell and the lower shell and extends to a bottom of the lower shell.

In some embodiments, an avoidance hole is provided inside the middle shell, a sealing ring is nested on a top of the avoidance hole, an avoidance enclosure of which a bottom end penetrates through the wireless charging PCBA and is connected to a top of the sealing ring is provided inside the upper shell, a circle of buckle is provided on a bottom of the upper shell, an inner wall of the middle shell is provided with a ring groove engaged with the buckle, a waterproof ring is provided between the middle shell and the upper shell, a clamping block is respectively provided on two sides of an inner wall of the avoidance enclosure, a decorative cover is clamped on a top of the upper shell through the clamping block, and a sticker which is bonded to a bottom of the decorative cover is provided on the top of the upper shell.

In some embodiments, the lever-type quick-release mechanism includes lock buckles, a slider, a lever and a connecting base, the connecting base is fixedly disposed on a bottom of the middle shell, two lock buckles are rotatably disposed inside the connecting base through a pin shaft, the two lock buckles are symmetrically arranged, and one end of the lock buckle penetrates through the avoidance hole and the avoidance enclosure and is bent to one side of the upper shell.

In some embodiments, a torsion spring of which one end is inserted into the lock buckle sleeves the pin shaft, a first inclined surface is provided on one side of the lock buckle, second inclined surfaces corresponding to and fitting with the two first inclined surfaces are provided at two ends of the slider, a slider reset spring is provided on one side of the slider, a notch is provided on the other side of the slider, a baffle abutting against one end of the slider reset spring is provided on the bottom of the middle shell, the lever is rotatably disposed on the bottom of the middle shell, one end of the lever is disposed on a protrusion matching the notch, and the other end of the lever is flat and penetrates through the through hole to extend out of the middle shell.

In some embodiments, the rotation positioning mechanism includes a transmission gear and two limiting bases symmetrically disposed inside the lower shell, the transmission gear is rotatably disposed inside the lower shell and a top of the transmission gear is movably sleeved with the central positioning shaft, a transmission rack is provided inside the limiting base through a rack reset spring, the transmission gear is rotatably disposed on the lower shell and meshed with the transmission rack, and a bottom of the transmission gear extends to the bottom of the lower shell and is provided with a connector.

In some embodiments, the three-dimensional shock absorbing mechanism includes a shock absorbing upper cover and a shock absorbing lower shell, a plurality of elastic elements distributed in a matrix are disposed between the shock absorbing upper cover and the shock absorbing lower shell, a bottom of the shock absorbing lower shell is provided with slide holes with the same count as the elastic elements and one-to-one correspondence with the elastic elements, the elastic element includes a pagoda-shaped spring and a limiting screw, the pagoda-shaped spring is clamped between the shock absorbing upper cover and the shock absorbing lower shell, the limiting screw penetrates through the slide hole and the pagoda-shaped spring in sequence and is then threadedly connected to the shock absorbing upper cover, and the bottom of the shock absorbing lower shell is provided with a nut hole.

In some embodiments, a slot engaged with the connector is disposed inside the shock absorbing upper cover, the slot is U-shaped, a slide tenon is movably clamped at an opening of one end of the slot, a positioning slot is disposed on one side of the slide tenon and one side of an inner wall of the slot, a positioning block is disposed inside the positioning slot, a fourth locking screw of which one end is screwed into the positioning block is disposed on a top of the shock absorbing upper cover, and when the three-dimensional shock absorbing mechanism rotates relative to the mount body, the fourth locking screw and an axis of the assembly hole are in a periodic misalignment and overlap state.

III. Beneficial Effects

Compared with the prior art, the present disclosure provides the magnetic wireless charging quick-release mount, which has the following beneficial effects.

The present disclosure realizes multi-functional integration through five innovative mechanisms. The lever-type quick-release mechanism realizes quick unlocking with one hand, the magnetic quick-lock mechanism provides precise attachment and automatically triggers mechanical locking, the wireless charging module ensures stable power supply, the rotation positioning mechanism realizes 360° multi-angle adjustment and precise positioning, and the three-dimensional shock absorbing mechanism effectively absorbs vibration impact. Various mechanisms work together to form a dynamic shock absorbing connection system, which has the functions of magnetic automatic alignment, one-step quick release, multi-directional adjustment, efficient shock absorption and wireless charging, thereby greatly improving the convenience, safety and endurance of the electronic product in mobile scenarios.

Figure 1:
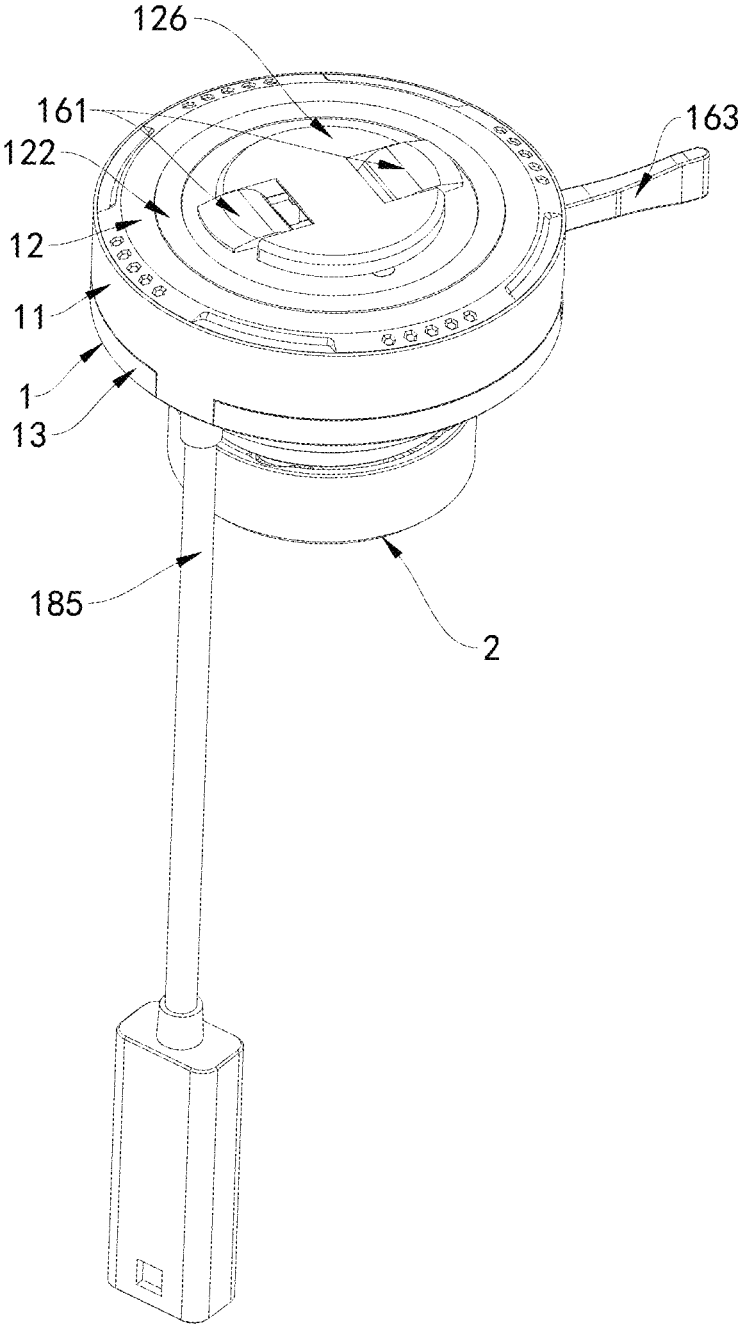
FIG. 1 is a schematic structural diagram of a mount body of the present disclosure.
Figure 2:
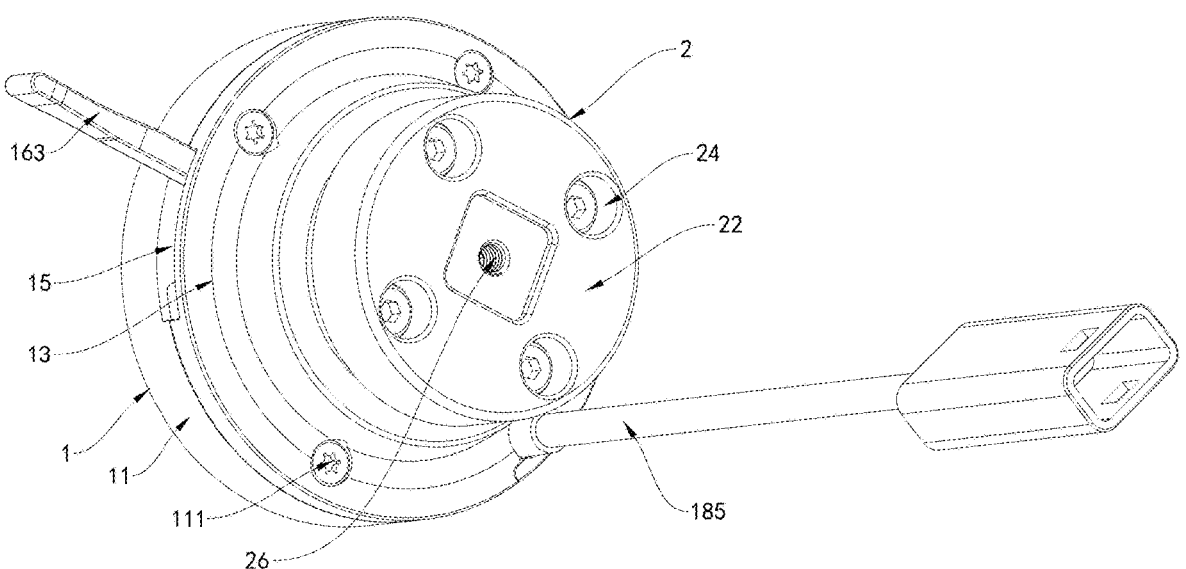
FIG. 2 is a side view of a mount body of the present disclosure.

Reference signs in the figures: 1. mount body; 11. middle shell; 111. first locking screw; 112. avoidance hole; 113. sealing ring; 114. ring groove; 115. waterproof ring; 116. baffle; 12. upper shell; 121. magnet mounting groove; 122. wear-resistant silicone pad; 123. avoidance enclosure; 124. buckle; 125. clamping block; 126. decorative cover; 127. sticker; 13. lower shell; 131. damping sealing pad; 132. assembly hole; 14. pressure plate; 141. second locking screw; 142. Central positioning shaft; 15. through hole; 16. lever-type quick-release mechanism; 161. lock buckle; 1611. First inclined surface; 162. slider; 1621. second inclined surface 2; 163. lever; 164. connecting base; 165. pin shaft; 166. torsion spring; 167. slider reset spring; 168. notch; 169. protrusion; 17. magnetic quick-lock mechanism; 171. magnet group; 172. support ring; 173. magnet; 18. wireless charging module; 181. wireless charging PCBA; 182. third locking screw; 183. tray; 184. wireless charging coil; 185. charging cable; 19. rotation positioning mechanism; 191. transmission gear; 192. limiting base; 193. rack reset spring; 194. transmission rack; 195. connector; 2. three-dimensional shock absorbing mechanism; 21. shock absorbing upper cover; 22. shock absorbing lower shell; 23. elastic element; 231. pagoda-shaped spring; 232. limiting screw; 24. slide hole; 25. nut hole; 26. slot; 27. slide tenon; 28. positioning groove; 281. positioning block; 29. fourth locking screw.

DETAILED DESCRIPTION

The following will clearly and completely describe the technical solution of the embodiments of the present disclosure with reference to the accompanying drawings in the embodiments of the present disclosure. Obviously, the described embodiments are only a part of the embodiments of the present disclosure, but not all the embodiments. Based on the embodiments of the present disclosure, all other embodiments obtained by those having ordinary skills in the art without making any creative efforts fall within the scope of protection of the present disclosure.

Embodiments

As shown in FIGS. 1-12, a magnetic wireless charging quick-release mount provided in one embodiment of the present disclosure includes:

a mount body 1 which is integrally provided with:

a lever-type quick-release mechanism 16 configured to control mechanical locking and release of an electronic product;

a magnetic quick-lock mechanism 17 configured to provide rapid attachment of the electronic product and trigger mechanical locking of the lever-type quick-release mechanism 16;

a wireless charging module 18 configured to wirelessly power the electronic product;

a rotation positioning mechanism 19 configured to adjust a circumferential angle of the rotation positioning mechanism 19 relative to the mount body 1 and achieve positioning;

a three-dimensional shock absorbing mechanism 2 configured to buffer an impact force transmitted to the mount body 1; wherein the three-dimensional shock absorbing mechanism 2 is rotatably connected to the mount body 1 through the rotation positioning mechanism 19 to form a dynamic shock absorbing connection system.

As shown in FIGS. 1-12, in some embodiments, the mount body 1 is disc-shaped, the mount body 1 includes a middle shell 11, an upper shell 12 is clamped on a top of the middle shell 11, a lower shell 13 is fixed on a bottom of the middle shell 11 by a first locking screw 111, the magnetic quick-locking mechanism 17 is integrated into an interior of the upper shell 12, the wireless charging module 18 is integrated into the top of the middle shell 11, the lever-type quick-release mechanism 16 is integrated into the bottom of the middle shell 11, the rotation positioning mechanism 19 is integrated into an interior of the lower shell 13 and separated from the lever-type quick-release mechanism 16 by a pressure plate 14, the pressure plate 14 is fixed to the bottom of the middle shell 11 by a second locking screw 141, one side of the middle shell 11 and one side of the lower shell 13 are jointly provided with a through hole 15, a bottom of the lower shell 13 is embedded with a damping sealing pad 131, the bottom of the lower shell 13 is provided with an assembly hole 132, and a bottom of the pressure plate 14 is provided with a central positioning shaft 142.

The upper shell 12 (the magnetic quick-lock mechanism 17), the middle shell 11 (the wireless charging module 18, and the lever-type quick-release mechanism 16), and the lower shell 13 (the rotation positioning mechanism 19) are fixed with the first locking screw 111, the second locking screw 141, the third locking screw 182, and the fourth locking screw 29 through the buckle 124 to form a modular assembly system. The modular design reduces the maintenance cost. A single damaged accessory can be replaced independently. The through holes 15 of the middle shell 11 and the lower shell 13 are aligned to provide a movement channel for the lever 163, while maintaining the integrity of the mount body 1. The damping sealing pad 131 is disposed between the three-dimensional shock absorbing mechanism 2 and the mount body 1 to achieve sealing and exert a damping effect, thereby ensuring more tactile feedback when the three-dimensional shock absorbing mechanism 2 and the mount body 1 rotate relative to each other.

Figure 3:
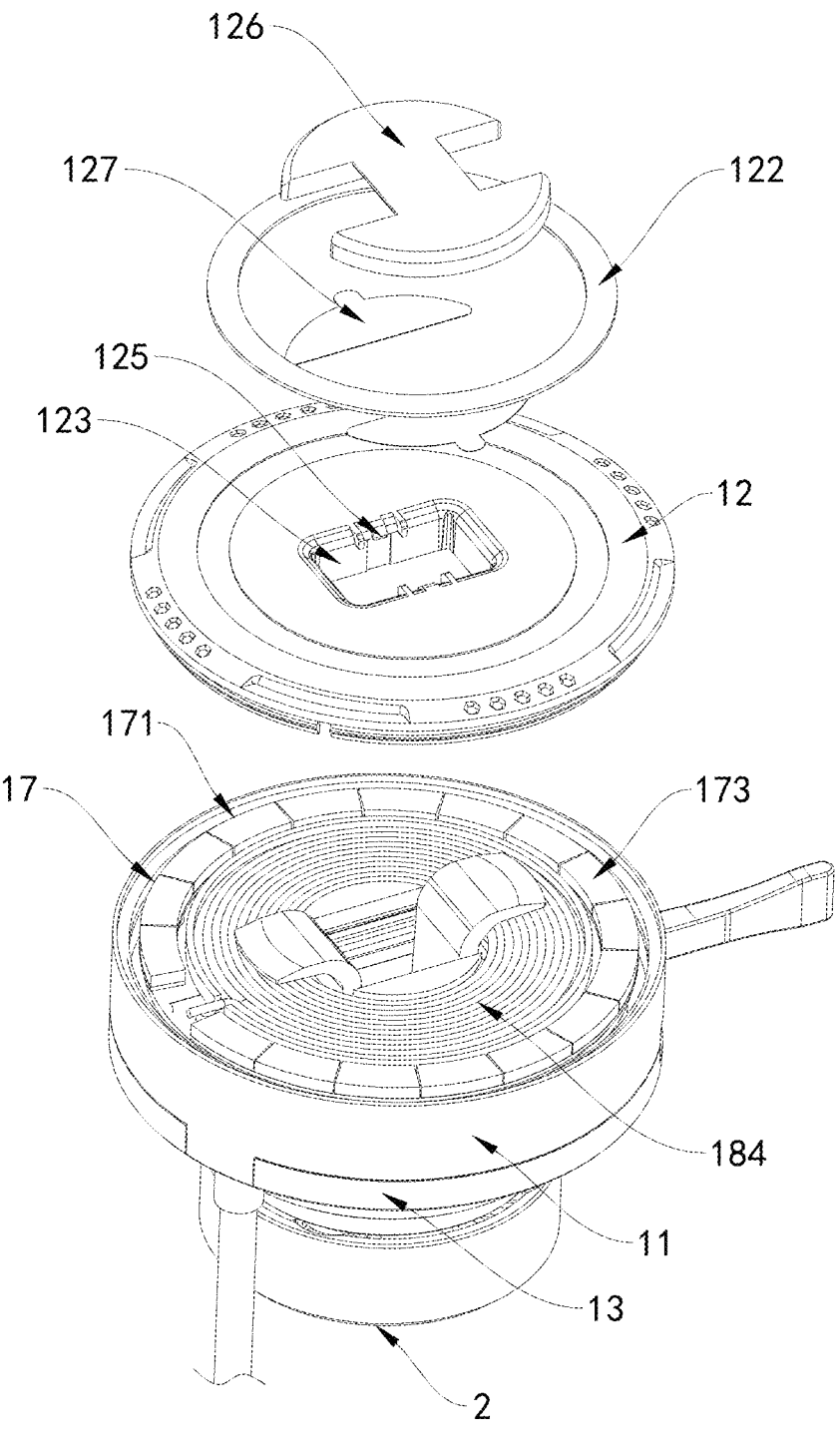
FIG. 3 is a schematic structural diagram of a wireless charging coil of the present disclosure.
Figure 4:
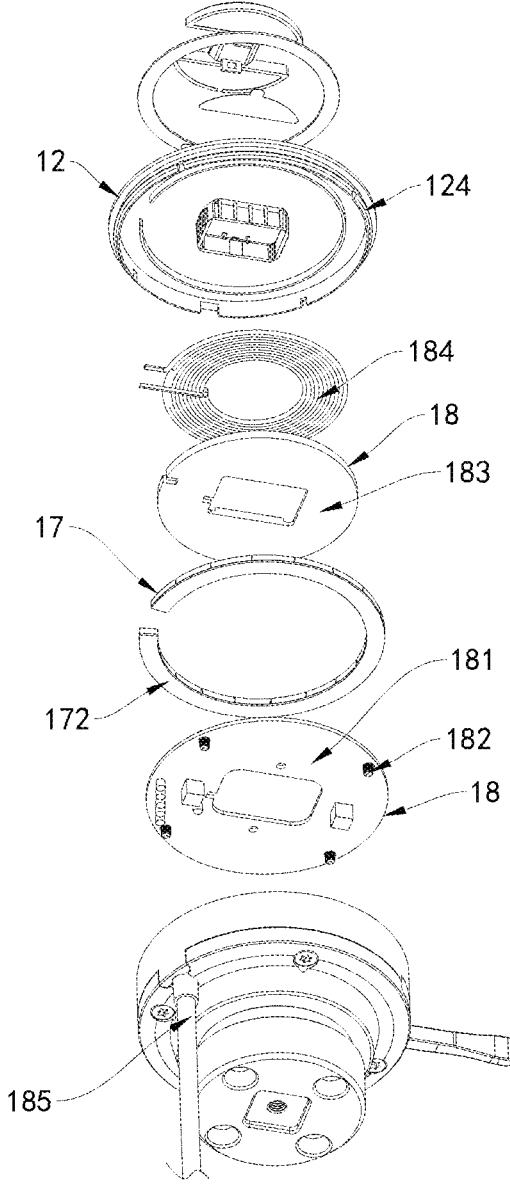
FIG. 4 is a schematic structural diagram of an upper shell of the present disclosure.
Figure 5:
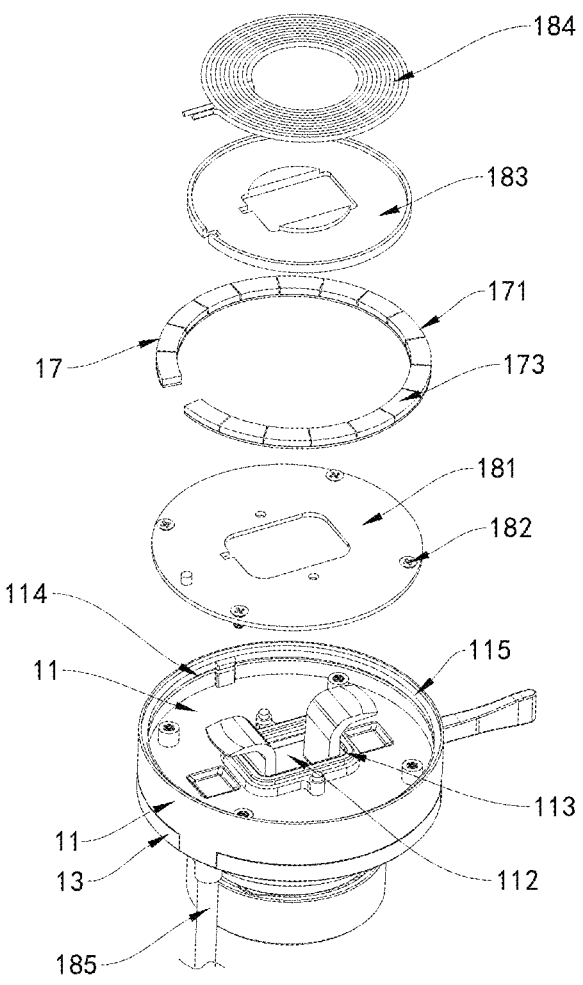
FIG. 5 is an exploded view of a wireless charging module of the present disclosure.
Figure 6:
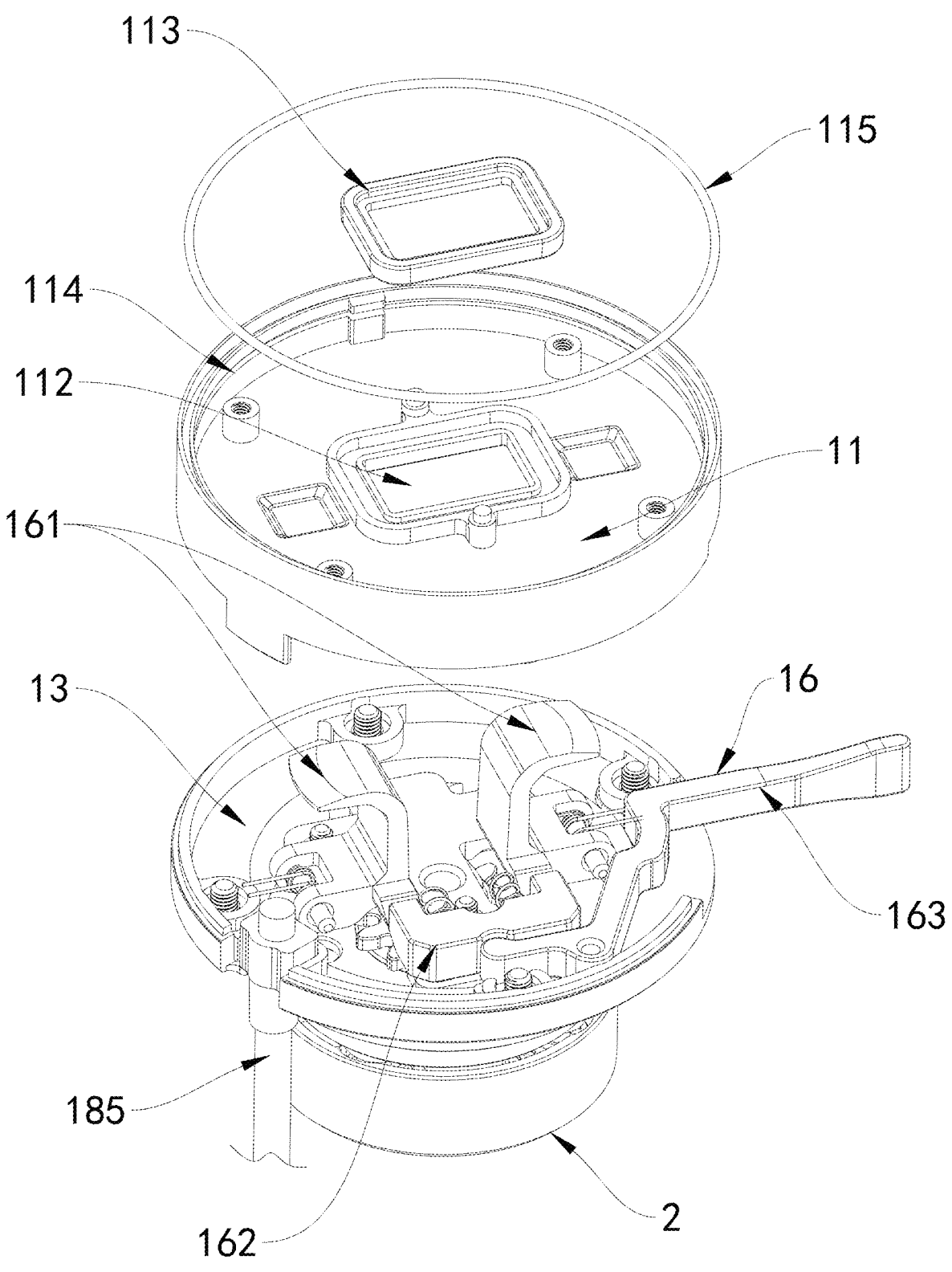
FIG. 6 is a schematic diagram of a lever-type quick-release mechanism of the present disclosure.
Figure 7:
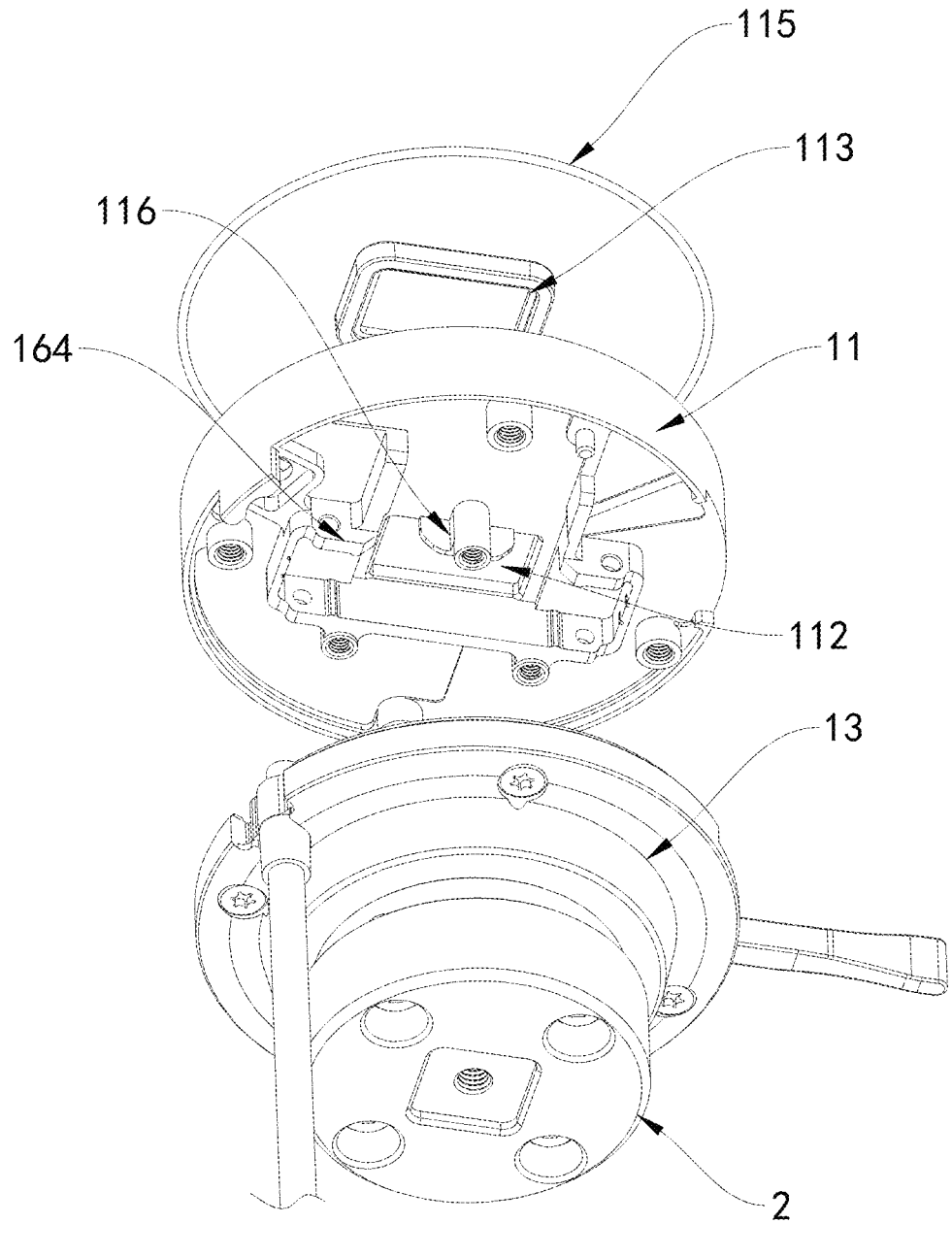
FIG. 7 is a schematic structural diagram of a middle shell of the present disclosure.
Figure 8:
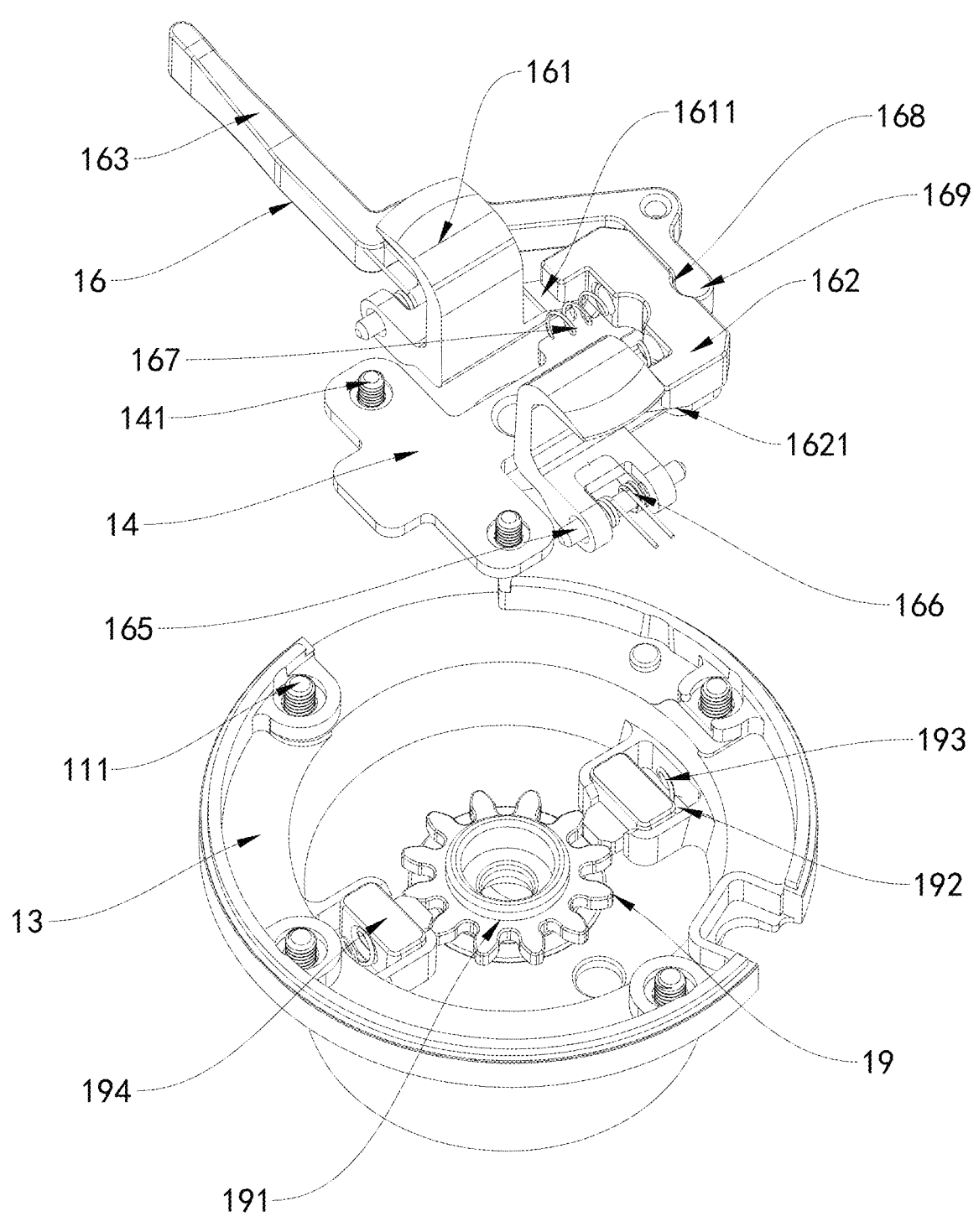
FIG. 8 is a schematic structural diagram of a rotation positioning mechanism of the present disclosure.

As shown in FIGS. 3-5, in some embodiments, the magnetic quick-lock mechanism 17 includes a magnet group 171 and a support ring 172, the support ring 172 is disposed on a bottom of the magnet group 171, a magnet mounting groove 121 is provided inside the upper shell 12, the magnet group 171 includes a plurality of magnets 173 disposed inside the magnet mounting groove 121 in an annular array, and a wear-resistant silicone pad 122 is embedded in a top of the upper shell 12.

The plurality of magnets 173 are evenly and circumferentially distributed to produce a uniform adsorption force field. Non-magnetic stainless steel is adopted to avoid magnetic short circuit and improve structural strength. The wear-resistant silicone pad 122 is disposed between the upper shell 12 and an electronic product protective shell to avoid wear on the electronic product protective shell. Meanwhile, during docking, the electronic product protective shell is prevented from being adsorbed to directly hit the upper shell 12, but instead touches the wear-resistant silicone pad 122, thereby further improving safety of use while reducing friction noise.

As shown in FIGS. 3-5, in some embodiments, the wireless charging module 18 includes a wireless charging PCBA 181, the wireless charging PCBA 181 is fixed to the top of the middle shell 11 by a third locking screw 182, a tray 183 is provided on a top of the wireless charging PCBA 181, a wireless charging coil 184 is provided inside the tray 183, a top of the wireless charging coil 184 is closely attached to a top of an inner wall of the upper shell 12, a charging cable 185 is integrated into a bottom of the wireless charging PCBA 181, and one end of the charging cable 185 penetrates through the middle shell 11 and the lower shell 13 and extends to a bottom of the lower shell 13.

The wireless charging PCBA 181 is fixed to the top of the middle shell 11 by the third locking screw 182, which ensures the structural stability of the wireless charging PCBA 181. The tray 183 is made of a ceramic insulating material, which has insulation and excellent heat insulation performance. The tray 183 is disposed between the wireless charging coil 184 and the wireless charging PCBA 181 to reduce heat conduction, thereby improving the product performance, and avoiding failures caused by high heat. The charging cable 185 is relatively long and can rotate several turns along with the mount body 1.

As shown in FIGS. 1-6, in some embodiments, an avoidance hole 112 is provided inside the middle shell 11, a sealing ring 113 is nested on a top of the avoidance hole 112, an avoidance enclosure 123 of which a bottom end penetrates through the wireless charging PCBA 181 and is connected to a top of the sealing ring 113 is provided inside the upper shell 12, a circle of buckle 124 is provided on a bottom of the upper shell 12, an inner wall of the middle shell 11 is provided with a ring groove 114 engaged with the buckle 124, a waterproof ring 115 is provided between middle shell 11 and the upper shell 12, a clamping block 125 is respectively provided on two sides of an inner wall of the avoidance enclosure 123, a decorative cover 126 is clamped on a top of the upper shell 12 through the clamping block 125, and a sticker 127 which is bonded to a bottom of the decorative cover 126 is provided on the top of the upper shell 12.

After the upper shell 12 is engaged with the ring groove 114 through the buckle 124, the upper shell 12 and the middle shell 11 are closed, and at the same time, the avoidance enclosure 123 inside the upper shell 12 presses the sealing ring 113. Although dust and water vapor can enter the lower shell 13 through the avoidance enclosure 123, they cannot enter between the top of the middle shell 11 and the upper shell 12. The design of the sealing ring 113 and the waterproof ring 115 ensures the waterproof sealing performance of the wireless charging module 18. Since the lock buckle 161 performs flipping movement, the setting of the decorative cover 126 can cover a portion of the avoidance enclosure 123 not interfering with the movement of the lock buckle 161, thereby improving the overall appearance of the product. In addition to the clamping block 125, the decorative cover 126 is bonded to the upper shell 12 through the sticker 127, thereby further ensuring the stability of the decorative cover 126.

As shown in FIGS. 6-9, in some embodiments, the lever-type quick-release mechanism 16 includes lock buckles 161, a slider 162, a lever 163 and a connecting base 164, the connecting base 164 is fixedly disposed on a bottom of the middle shell 11, two lock buckles 161 are rotatably disposed inside the connecting base 164 through a pin shaft 165, the two lock buckles 161 are symmetrically arranged, and one end of the lock buckle 161 penetrates through the avoidance hole 112 and the avoidance enclosure 123 and is bent to one side of the upper shell 12.

The top of the lock buckle 161 is L-shaped, and the two symmetrically arranged lock buckles 161 can be triggered synchronously through the slider 162. The structural design is ingenious, simple and compact, so that the mount body 1 can integrate more functions while being made thinner. The connecting base 164 provides a mounting space for the lock buckle 161 so as to ensure the stability of the lock buckle 161.

As shown in FIGS. 6-9, in some embodiments, a torsion spring 166 of which one end is inserted into the lock buckle 161 sleeves the pin shaft 165, a first inclined surface 1611 is provided on one side of the lock buckle 161, second inclined surfaces 1621 corresponding to and fitting with the two first inclined surfaces 1611 are provided at two ends of the slider 162, a slider reset spring 167 is provided on one side of the slider 162, a notch 168 is provided on the other side of the slider 162, a baffle 116 abutting against one end of the slider reset spring 167 is provided on the bottom of the middle shell 11, the lever 163 is rotatably disposed on the bottom of the middle shell 11, one end of the lever 163 is disposed on a protrusion 169 matching the notch 168, and the other end of the lever 163 is flat and penetrates through the through hole 15 to extend out of the middle shell 11.

The end of the lever 163 extending to the outside of the middle shell 11 is flat, which makes it easy for the user to operate without slipping, and has a large contact area, making it more comfortable to touch. One end of the slider reset spring 167 abuts against the baffle 116, and the other end of the slider reset spring 167 abuts against the slider 162 and continuously applies a force to the slider 162 to abut against the lever 163, so that the lever 163 and the slider 162 remain in a reset state. When unlocking is required, the lever 163 is pushed, and the lever 163 drives the protrusion at one end thereof to abut against the notch 168 on one side of the slider 162, and the slider 162 moves laterally, and the second inclined surfaces 1621 disposed at the two ends thereof abut against the first inclined surfaces 1611 disposed on the two lock buckles 161, and at the same time, the slider 162 compresses one of the slider reset springs 167. When the two first inclined surfaces 1611 are abutted, the two lock buckles 161 are driven to flip down relatively, and at the same time, the lock buckles 161 compress the torsion spring 166. The lock buckles 161 flip down to make one end be disengaged from the slot inside the electronic product protective shell, thereby unlocking the electronic product protective shell and removing the electronic product protective shell. After releasing the lever 163, the lock buckles 161, the slider 162, and the lever 163 are reset in sequence. When docking again, the lever 163 does not need to be operated, and the electronic product protective shell can be directly held close to the decorative cover 126 and attracted by the magnet group 171. The slot on the electronic product protective shell abuts against the lock buckle 161 to automatically compress the torsion spring 166 to flip. When the lock buckle 161 is opposite to the slot, the torsion spring 166 rebounds and drives the lock buckle 161 to reset and automatically snap into the slot to achieve locking.

As shown in FIGS. 8-11, in some embodiments, the rotation positioning mechanism 19 includes a transmission gear 191 and two limiting bases 192 symmetrically disposed inside the lower shell 13, the transmission gear 191 is rotatably disposed inside the lower shell 13 and a top of the transmission gear 191 is movably sleeved with the central positioning shaft 142, a transmission rack 194 is provided inside the limiting base 192 through a rack reset spring 193, the transmission gear 191 is rotatably disposed on the lower shell 13 and meshed with the transmission rack 194, and a bottom of the transmission gear 191 extends to the bottom of the lower shell 13 and is provided with a connector 195.

The setting of the limiting base 192 limits the reciprocating path of the transmission rack 194, and the rack reset spring 193 continuously applies a thrust to the transmission rack 194, so that the transmission rack 194 maintains the meshing with the transmission gear 191, so as to realize the positioning of the transmission gear 191. When it needs to adjust the angle of the mount body 1 relative to the gear and the three-dimensional shock absorbing mechanism 2 and the three-dimensional shock absorbing mechanism 2 and the riding bracket are fixed, the mount body 1 is rotated, and the mount body 1 drives the transmission rack 194 to abut against the teeth on the transmission gear 191. The inclined guide of the transmission rack 194 makes the transmission rack 194 retreat and compress the rack reset spring 193 for avoidance, and re-engages with the next tooth, so as to realize the precise adjustment and positioning of the angle of the mount body 1. The horizontal design of the transmission rack 194 can reduce the overall thickness of the product, making the mount body 1 thinner and the appearance more beautiful.

Figure 9:
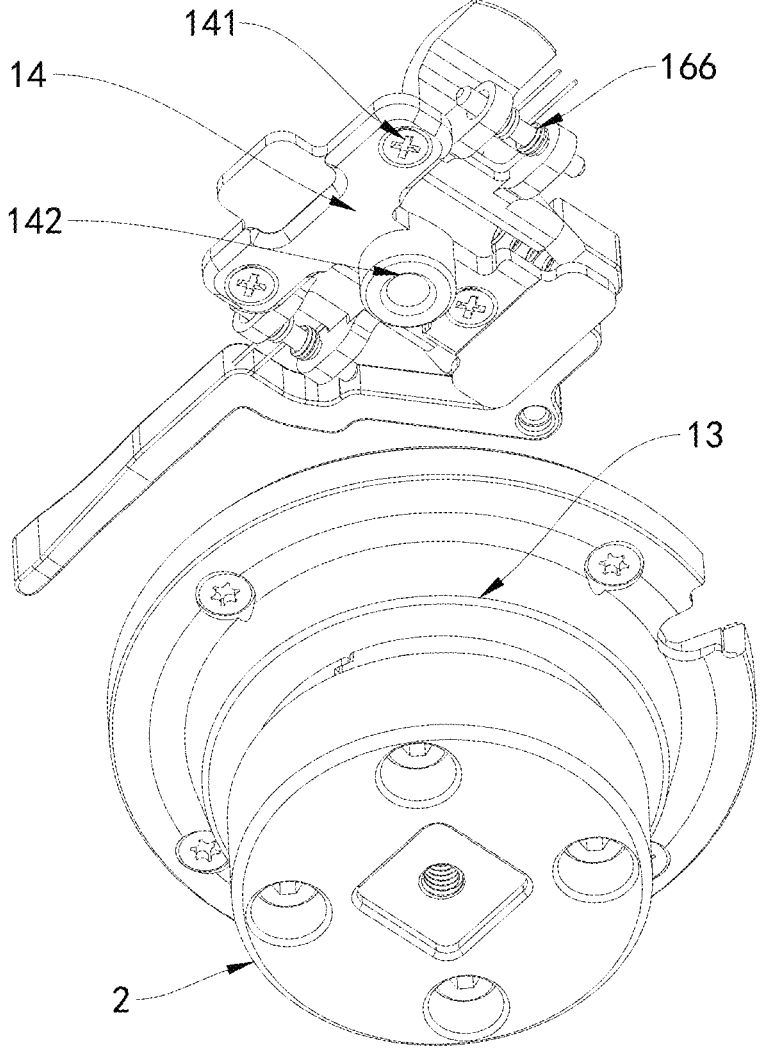
FIG. 9 is a schematic structural diagram of a pressure plate of the present disclosure.
Figure 10:
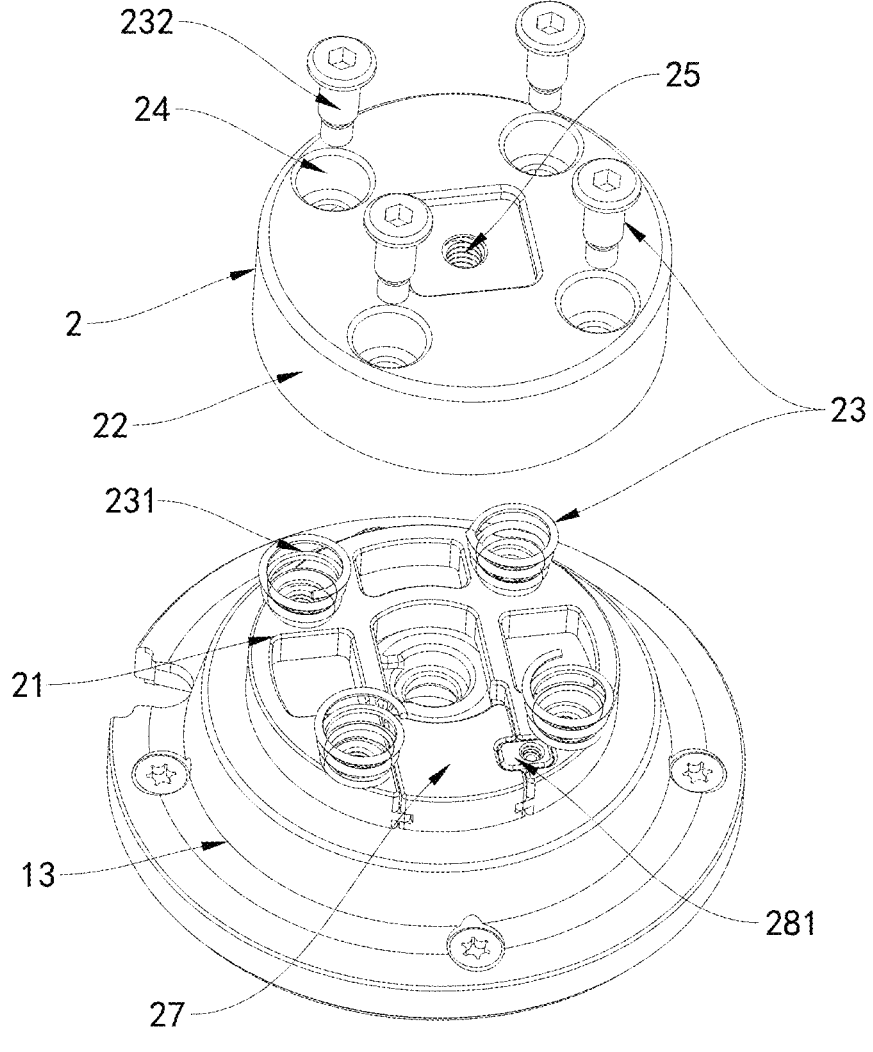
FIG. 10 is a schematic structural diagram of a shock absorbing upper cover of the present disclosure
Figure 11:
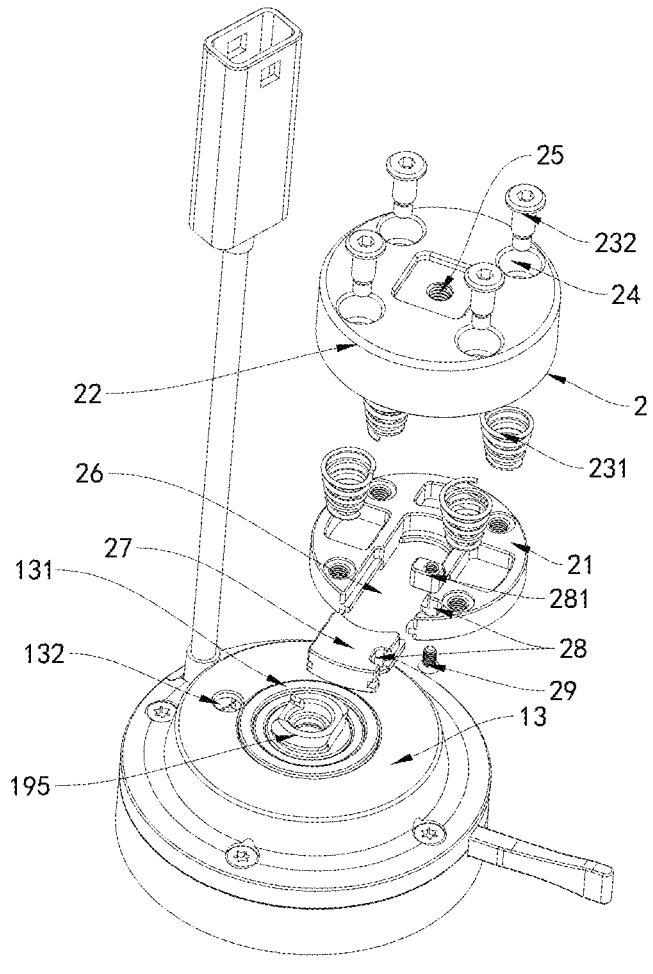
FIG. 11 is an exploded view of a three-dimensional shock absorbing mechanism of the present disclosure.
Figure 12:
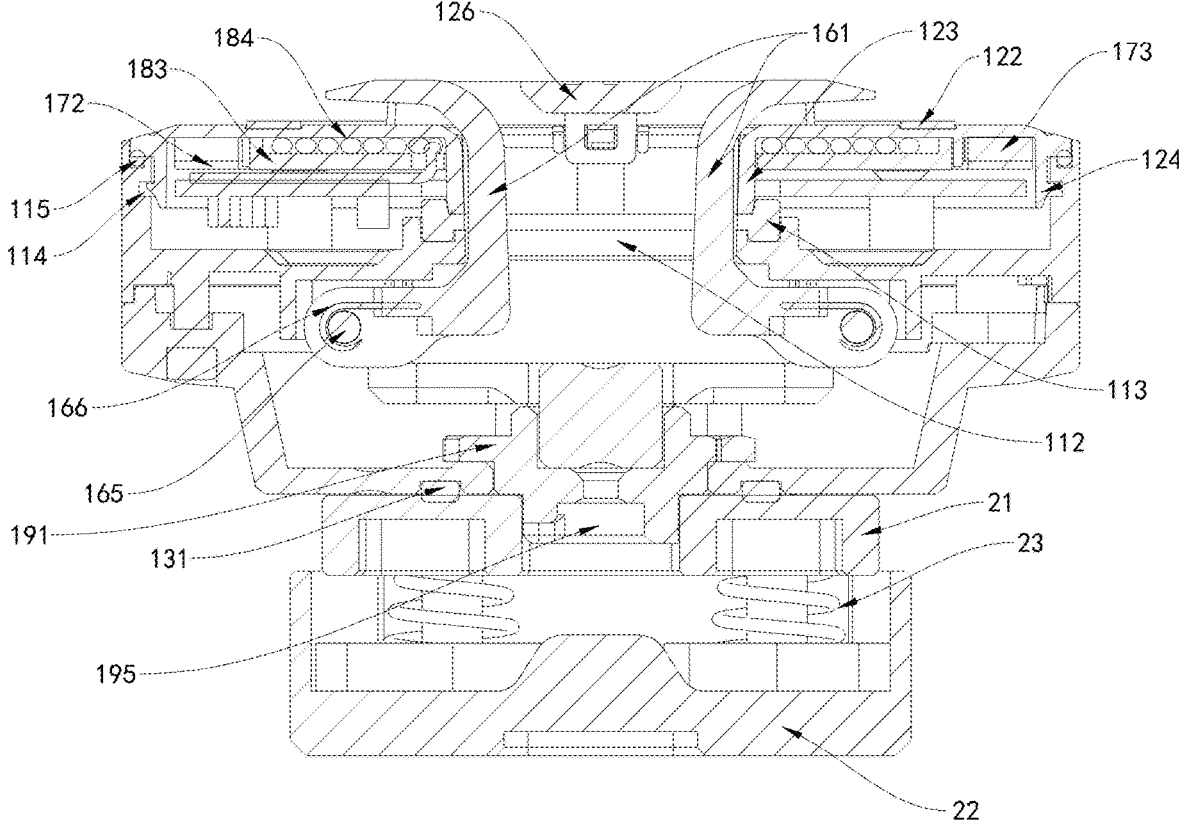
FIG. 12 is a cross-sectional view of a lock buckle of the present disclosure.

As shown in FIGS. 9-11, in some embodiments, the three-dimensional shock absorbing mechanism 2 includes a shock absorbing upper cover 21 and a shock absorbing lower shell 22, a plurality of elastic elements 23 distributed in a matrix are disposed between the shock absorbing upper cover 21 and the shock absorbing lower shell 22, a bottom of the shock absorbing lower shell 22 is provided with slide holes 24 with the same count as the elastic elements 23 and one-to-one correspondence with the elastic elements 23, the elastic element 23 includes a pagoda-shaped spring 231 and a limiting screw 232, the pagoda-shaped spring 231 is clamped between the shock absorbing upper cover 21 and the shock absorbing lower shell 22, the limiting screw 232 penetrates through the slide hole 24 and the pagoda-shaped spring 231 in sequence and is then threadedly connected to the shock absorbing upper cover 21, and the bottom of the shock absorbing lower shell 22 is provided with a nut hole 25.

During the compression process of the pagoda-shaped spring 231, the diameter of each circle changes gradually, realizing a nonlinear stiffness change from soft to hard. In an initial stage, low stiffness buffers impact, and in a later stage, high stiffness supports heavy loads to adapt to different vibration intensities. The conical spiral design ensures that the coils are staggered during compression to avoid the stacking and collision problems of ordinary springs and reduce the risk of metal fatigue and deformation. The cone structure achieves a larger compression stroke within a limited height and has more deformation than a cylindrical spring within the same mounting space. The nut hole 25 is provided for connecting a universal fixing bracket on a bicycle or motorcycle. The three-dimensional shock absorbing mechanism 2 is fixed to a bicycle, electric bicycle or motorcycle, electric motorcycle or other riding equipment by the nut. By connecting the charging cable 185 to the power supply or power bank on the riding equipment, electronic products such as a smartphone can be wirelessly charged. The electronic products need to use a protective shell that matches the lever-type quick-release mechanism 16.

The elastic elements 23 disposed inside the shock absorbing lower shell 22 make the elastic elements 23 invisible from the outside of the product, thereby improving the overall appearance of the product.

As shown in FIGS. 9-11, in some embodiments, a slot 26 engaged with the connector 195 is disposed inside the shock absorbing upper cover 21, the slot 26 is U-shaped, a slide tenon 27 is movably clamped at an opening of one end of the slot 26, a positioning slot 28 is disposed on one side of the slide tenon 27 and one side of an inner wall of the slot 26, a positioning block 281 is disposed inside the positioning slot 28, a fourth locking screw 29 of which one end is screwed into the positioning block 281 is disposed on a top of the shock absorbing upper cover 21, and when the three-dimensional shock absorbing mechanism 2 rotates relative to the mount body 1, the fourth locking screw 29 and an axis of the assembly hole 132 are in a periodic misalignment and overlap state.

The end of the limiting screw 232 that is sleeved with the slide hole 24 allows the shock absorbing lower shell 22 to float for shock absorption relative to the limiting screw 232 through the slide hole 24. With the pagoda-shaped spring 231 distributed in a matrix, the vibration transmitted from the riding equipment to the mount body 1 can be greatly reduced, reducing damage to the electronic products and improving the stability of the electronic products after assembly, so that the electronic products will not fall off. When the three-dimensional shock absorbing mechanism 2 and the mount body 1 rotate relative to each other, the rotation path of the assembly hole 132 and the fourth locking screw 29 coincide. When mounting the three-dimensional shock absorbing mechanism 2, first the slot 26 of the shock absorbing upper cover 2 1 is clamped on the connector 195, and the slide tenon 27 slides into one end of the slot 26, so that the slide tenon 27 cooperates with the slot 26 to clamp the connector 195, and then the positioning block 281 fills into the positioning groove 28 after the assembly is completed to complete preliminary positioning. The mount body 1 is rotated to make the assembly hole 132 be opposite to the positioning block 281, and the fourth locking screw 29 is screwed into the positioning block 281 through the assembly hole 132. The fourth locking screw 29 pulls the positioning block 281 without affecting the relative rotation of the lower shell 13 and the shock absorbing upper cover 21.

During use, the electronic product needs to use a protective shell that matches the lever-type quick-release mechanism 16. The three-dimensional shock absorbing mechanism 2 is fixed to a bicycle, an electric bicycle, a motorcycle, an electric motorcycle, or other riding equipment through the nut. The charging cable 185 is connected to the power supply or power bank on the riding equipment, so that the smartphone and other electronic products can be wirelessly charged;

During unlocking, the lever 163 is pushed, and the lever 163 drives the protrusion at one end to abut against the notch 168 on one side of the slider 162, the slider 162 moves laterally, the second inclined surfaces 1621 at the two ends abut against the first inclined surfaces 1611 on the two lock buckles 161, and at the same time, the slider 162 compresses one of the slider reset springs 167. When the two inclined surfaces 1611 are abutted, the two lock buckles 161 are driven to flip downward relative to each other, the lock buckles 161 compress the torsion spring 166, and the lock buckles 161 flip downward so that one end is disengaged from the slot inside the electronic product protective shell, thereby unlocking the electronic product protective shell, and removing the electronic product protective shell. After the lever 163 is released, the lock buckles 161, the slider 162, and the lever 163 are reset in sequence;

When docking again, the lever 163 does not need to be operated, and the electronic product protective shell is directly held close to the decorative cover 126 and attracted by the magnet group 171. The slot on the electronic product protective shell abuts against the lock buckle 161 to automatically compress the torsion spring 166 to flip. When the lock buckle 161 is opposite to the slot, the torsion spring 166 rebounds and drives the lock buckle 161 to reset and automatically snap into the slot to achieve locking.

In summary, multi-functional integration is achieved through five innovative mechanisms. The lever-type quick-release mechanism 16 realizes quick unlocking with one hand. The magnetic quick-lock mechanism 17 provides precise adsorption and automatically triggers mechanical locking. The wireless charging module 18 ensures stable power supply. The rotation positioning mechanism 19 realizes 360° multi-angle adjustment and precise positioning. The three-dimensional shock absorbing mechanism 2 effectively absorbs vibration and impact. Each mechanism works together to form a dynamic shock absorbing connection system, which has the functions of magnetic automatic alignment, one-step quick release, multi-directional adjustment, efficient shock absorption and wireless charging, thereby greatly improving the convenience, safety and battery life of electronic products in mobile scenarios.

Finally, it should be noted that the above description is only a preferred embodiment of the present disclosure and is not intended to limit the present disclosure. Although the present disclosure is described in detail with reference to the above embodiments, those skilled in the art can still modify the technical solutions recorded in the above embodiments or replace some of the technical features therein by equivalents. Any modification, equivalent replacement, improvement, etc. made within the spirit and principle of the present disclosure shall be included in the scope of protection of the present disclosure.

The invention claimed is:

1. A magnetic wireless charging quick-release mount, comprising:

a mount body (1) which is integrally provided with:

a lever-type quick-release mechanism (16) configured to control mechanical locking and release of an electronic product;

a magnetic quick-lock mechanism (17) configured to provide rapid attachment of the electronic product and trigger mechanical locking of the lever-type quick-release mechanism (16);

a wireless charging module (18) configured to wirelessly power the electronic product;

a rotation positioning mechanism (19) configured to adjust a circumferential angle of the rotation positioning mechanism (19) relative to the mount body (1) and achieve positioning; and a three-dimensional shock absorbing mechanism (2) configured to buffer an impact force transmitted to the mount body (1);

wherein the three-dimensional shock absorbing mechanism (2) is rotatably connected to the mount body (1) through the rotation positioning mechanism (19) to form a dynamic shock absorbing connection system; and wherein the mount body (1) is disc-shaped, the mount body (1) includes a middle shell (11), an upper shell (12) is clamped on a top of the middle shell (11), a lower shell (13) is fixed on a bottom of the middle shell (11) by a first locking screw (111), the magnetic quick-locking mechanism (17) is integrated into an interior of the upper shell (12), the wireless charging module (18) is integrated into the top of the middle shell (11), the lever-type quick-release mechanism (16) is integrated into the bottom of the middle shell (11), the rotation positioning mechanism (19) is integrated into an interior of the lower shell (13) and separated from the lever-type quick-release mechanism (16) by a pressure plate (14), the pressure plate (14) is fixed to the bottom of the middle shell (11) by a second locking screw (141), one side of the middle shell (11) and one side of the lower shell (13) are jointly provided with a through hole (15), a bottom of the lower shell (13) is embedded with a damping sealing pad (131), the bottom of the lower shell (13) is provided with an assembly hole (132), and a bottom of the pressure plate (14) is provided with a central positioning shaft (142).

2. The magnetic wireless charging quick-release mount of claim 1, wherein the magnetic quick-lock mechanism (17) includes a magnet group (171) and a support ring (172), the support ring (172) is disposed on a bottom of the magnet group (171), a magnet mounting groove (121) is provided inside the upper shell (12), the magnet group (171) includes a plurality of magnets (173) disposed inside the magnet mounting groove (121) in an annular array, and a wear-resistant silicone pad (122) is embedded in a top of the upper shell (12).

3. The magnetic wireless charging quick-release mount of claim 1, wherein the wireless charging module (18) includes a wireless charging PCBA (181), the wireless charging PCBA (181) is fixed to the top of the middle shell (11) by a third locking screw (182), a tray (183) is provided on a top of the wireless charging PCBA (181), a wireless charging coil (184) is provided inside the tray (183), a top of the wireless charging coil (184) is attached to a top of an inner wall of the upper shell (12), a charging cable (185) is integrated into a bottom of the wireless charging PCBA (181), and one end of the charging cable (185) penetrates through the middle shell (11) and the lower shell (13) and extends to a bottom of the lower shell (13).

4. The magnetic wireless charging quick-release mount of claim 1, wherein an avoidance hole (112) is provided inside the middle shell (11), a sealing ring (113) is nested on a top of the avoidance hole (112), an avoidance enclosure (123) of which a bottom end penetrates through the wireless charging PCBA (181) and is connected to a top of the sealing ring (113) is provided inside the upper shell (12), a circle of buckle (124) is provided on a bottom of the upper shell (12), an inner wall of the middle shell (11) is provided with a ring groove (114) engaged with the buckle (124), a waterproof ring (115) is provided between the middle shell (11) and the upper shell (12), a clamping block (125) is respectively provided on two sides of an inner wall of the avoidance enclosure (123), a decorative cover (126) is clamped on a top of the upper shell (12) through the clamping block (125), and a sticker (127) which is bonded to a bottom of the decorative cover (126) is provided on the top of the upper shell (12).

5. The magnetic wireless charging quick-release mount of claim 1, wherein the lever-type quick-release mechanism (16) includes two lock buckles (161), a slider (162), a lever (163) and a connecting base (164), the connecting base (164) is fixedly disposed on a bottom of the middle shell (11), the lock buckles (161) are rotatably disposed inside the connecting base (164) through a pin shaft (165), the lock buckles (161) are symmetrically arranged, and one end of each lock buckle (161) penetrates through the avoidance hole (112) and the avoidance enclosure (123) and is bent to one side of the upper shell (12).

6. The magnetic wireless charging quick-release mount of claim 5, wherein a torsion spring (166) of which one end is inserted into the lock buckle (161) sleeves the pin shaft (165), a first inclined surface (1611) is provided on one side of each lock buckle (161), second inclined surfaces (1621) corresponding to and fitting with the first inclined surfaces (1611) are provided at two ends of the slider (162), a slider reset spring (167) is provided on one side of the slider (162), a notch (168) is provided on the other side of the slider (162), a baffle (116) abutting against one end of the slider reset spring (167) is provided on the bottom of the middle shell (11), the lever (163) is rotatably disposed on the bottom of the middle shell (11), one end of the lever (163) is disposed on a protrusion (169) matching the notch (168), and the other end of the lever (163) is flat and penetrates through the through hole (15) to extend out of the middle shell (11).

7. The magnetic wireless charging quick-release mount of claim 1, wherein the rotation positioning mechanism (19) includes a transmission gear (191) and two limiting bases (192) symmetrically disposed inside the lower shell (13), the transmission gear (191) is rotatably disposed inside the lower shell (13) and a top of the transmission gear (191) is movably sleeved with the central positioning shaft (142), a transmission rack (194) is provided inside the limiting base (192) through a rack reset spring (193), the transmission gear (191) is rotatably disposed on the lower shell (13) and meshed with the transmission rack (194), and a bottom of the transmission gear (191) extends to the bottom of the lower shell (13) and is provided with a connector (195).

8. The magnetic wireless charging quick-release mount of claim 1, wherein the three-dimensional shock absorbing mechanism (2) includes a shock absorbing upper cover (21) and a shock absorbing lower shell (22), a plurality of elastic elements (23) distributed in a matrix are disposed between the shock absorbing upper cover (21) and the shock absorbing lower shell (22), a bottom of the shock absorbing lower shell (22) is provided with slide holes (24) with the same count as the elastic elements (23) and one-to-one correspondence with the elastic elements (23), each elastic element (23) includes a pagoda-shaped spring (231) and a limiting screw (232), the pagoda-shaped spring (231) is clamped between the shock absorbing upper cover (21) and the shock absorbing lower shell (22), the limiting screw (232) penetrates through the slide hole (24) and the pagoda-shaped spring (231) in sequence and is threadedly connected to the shock absorbing upper cover (21), and the bottom of the shock absorbing lower shell (22) is provided with a nut hole (25).

9. The magnetic wireless charging quick-release mount of claim 8, wherein a slot (26) engaged with the connector (195) is disposed inside the shock absorbing upper cover (21), the slot (26) is U-shaped, a slide tenon (27) is movably clamped at an opening of one end of the slot (26), a positioning slot (28) is disposed on one side of the slide tenon (27) and one side of an inner wall of the slot (26), a positioning block (281) is disposed inside the positioning slot (28), a fourth locking screw (29) of which one end is screwed into the positioning block (281) is disposed on a top of the shock absorbing upper cover (21), and when the three-dimensional shock absorbing mechanism (2) rotates relative to the mount body (1), the fourth locking screw (29) and an axis of the assembly hole (132) are in a periodic misalignment and overlap state.

\* \* \* \* \*